US012565867B2

(12) United States Patent
Limane et al.

(10) Patent No.: US 12,565,867 B2
(45) Date of Patent: Mar. 3, 2026

(54) PROCESS FOR CONTROLLING A GASEOUS BLEND IN A COMBUSTION CHAMBER OF A TWO-STROKE CYCLE OF AN INTERNAL COMBUSTION ENGINE

(71) Applicant: Abdelhakim Limane, Saint-Laurent (CA)

(72) Inventors: Abdelhakim Limane, Saint-Laurent (CA); Mustapha Limane, Reghaia (DZ)

( * ) Notice: Subject to any disclaimer, the term of this patent is extended or adjusted under 35 U.S.C. 154(b) by 0 days.

(21) Appl. No.: 18/346,369

(22) Filed: Jul. 3, 2023

(65) Prior Publication Data

US 2025/0122851 A1 Apr. 17, 2025

(51) Int. Cl.
*F02M 23/00* (2006.01)
*F02M 23/08* (2006.01)
(Continued)

(52) U.S. Cl.
CPC ............ *F02M 23/08* (2013.01); *F02M 23/10* (2013.01); *F02M 23/14* (2013.01); *F02M 31/20* (2013.01);
(Continued)

(58) Field of Classification Search
CPC .... F02B 25/04; F02B 2075/025; F02B 21/00; F02B 29/04; F02B 2075/1808; F02M 2023/008; F02M 21/0275; F02M 21/0248; F02M 23/14; F02M 31/20; F02M 31/00; F02M 31/02; F02M 31/14; F02D 21/10
See application file for complete search history.

(56) References Cited

U.S. PATENT DOCUMENTS 8,918,238 B2 * 12/2014 Hu .......................... F02B 33/34
701/22
2003/0159665 A1 * 8/2003 Coney ................. F02D 13/0253
123/65 VD
(Continued)

FOREIGN PATENT DOCUMENTS

BG 112799 A * 4/2020
CN 103696848 A * 4/2014
(Continued)

OTHER PUBLICATIONS

JP 2012047138 English Translation (Year: 2012).*

*Primary Examiner* — George C Jin
*Assistant Examiner* — Teuta B Holbrook
(74) *Attorney, Agent, or Firm* — PRAXIS

(57) ABSTRACT

A process relating to a two-stroke cycle internal combustion engine to control the pressure and/or the temperature of the gaseous blend inside the combustion chamber at the time of ignition of combustion, while the air/fuel mixture is maintained close to the stoichiometric ratio. The process is mainly based on high compression by an auxiliary compressor of air that is accumulated in a reservoir. The compressed air is typically injected at two different temperatures, one being relatively cold and the other being relatively hot, as heated by the heat energy recovered from exhaust gases or heaters. The intake compressed air is carried out with predetermined quantity from both temperatures as an injection into the cylinder which already contains a predetermined quantity of the burnt gases from the previous combustion cycle.

9 Claims, 2 Drawing Sheets

(51) Int. Cl.

| | |
|---|---|
| ***F02M 23/10*** | (2006.01) |
| ***F02M 23/14*** | (2006.01) |
| ***F02M 31/20*** | (2006.01) |
| *F02B 75/02* | (2006.01) |

(52) U.S. Cl.

CPC .. *F02B 2075/025* (2013.01); *F02M 2023/008* (2013.01)

(56) References Cited

U.S. PATENT DOCUMENTS

| | | | | |
|---|---|---|---|---|
| 2004/0261415 A1* | 12/2004 | Negre | ...................... | F01B 17/02 60/650 |
| 2017/0022908 A1* | 1/2017 | Dortch, Jr. | .............. | F02B 37/04 |

FOREIGN PATENT DOCUMENTS

| | | | | | |
|---|---|---|---|---|---|
| CZ | 26088 | U1 * | 11/2013 | | |
| DE | 102012002566 | A1 * | 8/2013 | .............. | F02B 21/00 |
| JP | 2012047138 | A * | 3/2012 | | |

* cited by examiner

PROCESS FOR CONTROLLING A GASEOUS BLEND IN A COMBUSTION CHAMBER OF A TWO-STROKE CYCLE OF AN INTERNAL COMBUSTION ENGINE

FIELD OF THE INVENTION

The present invention relates to a process for all internal combustion engine types in order to improve energy efficiency and to reduce polluting emissions. This process regulates regardless of the load, the pressure or the temperature, or both pressure and temperature inside the combustion chamber when the combustion is engaged.

BACKGROUND OF THE INVENTION

Over the last years, several innovations have been carried out to improve energy efficiency and to reduce the polluting emissions of internal combustion engines. These include the downsizing with turbocharger, the recirculation of the burnt exhaust gases (EGR) and the adoption of the direct injection that allows cooling the admitted air, creating a stratified mixture and controlling the oxygen level, especially at low load. However, it should be noted that on the one hand, these solutions cannot meet the environmental standards requirements. The engines manufacturers have had to equip them with larger particulate filters and chemical catalysts causing the loss of efficiency and increasing weight. On the other hand, the operation of the engine at low revolution per minute (RPM) and low load have been favored over that at high RPM and full load, in addition to the unreliability issue resulting therefrom.

BACKGROUND OF THE INVENTION

The present invention is typically based on the following steps:

- Highly compressing the air via an auxiliary compressor.
- Accumulating compressed air at a relatively cold temperature in the reservoir.
- Operating the internal combustion engine with a two-stroke cycle.
- Keeping in the cylinder, for the current combustion cycle, a portion of the hot burnt gases from the preceding combustion cycle.
- Having intake valves extremely small and lightweight as compressed air injectors individually controlled by the engine control unit (ECU).
- Having a heat exchanger to heat up the compressed air from the burnt exhaust gases.

This process is mainly based on the high compression of the air by an auxiliary compressor, driven by the internal combustion engine. As a result, once the air is captured and filtered by an air filter, its compression is at least partially carried out by the auxiliary compressor rather than the piston of the internal combustion engine. Therefore, the energy necessary to produce this compression will be minimized, because it can be carried out in a well-cooled manner. This compressed air is typically accumulated in a reservoir at relatively cold temperatures (ambient environment) and will be used for different purposes such as combustion oxidizer, heat transfer fluid to recover part of the heat energy of the burnt exhaust gases before they are released and to actuate pneumatic systems of the engine. Furthermore, this reservoir of compressed air provides several advantages:

- Recovering portion of the kinetic energy of the vehicle in the form of compressed air by using the auxiliary compressor as a brake.
- Recovering the mechanical energy of the internal combustion engine when idling (or without any external load) in the form of compressed air.
- Using a compressor or compressors as a variable additional load for the internal combustion engine to help the internal combustion engine to operate at its ultimate operating condition.
- Actuating the internal combustion engine as a pneumatic motor.
- Eliminating the turbo lag, if the engine is equipped with a turbocharger, since the latter does not directly interfere with the engine.
- Less risk of burning the oil vapors, since the gases coming from the crankcase first flow through the auxiliary compressor and the reservoir.
- Possibility to obtain additional power for short period of times by momentarily disconnecting the auxiliary compressor from the engine.

The process of the present invention typically operates an internal combustion engine with a two-stroke cycle. During the downward stroke of the piston, the engine produces the power from the expansion of the gases in the cylinder.

However, the fact that the engine operates with a two-stroke cycle, the weight, the size and the friction are divided by two compared to an engine operating with a four-stroke cycle. On the other hand, the exhaust camshaft can be used to balance the engine since it has the same rotational speed as the crankshaft.

Since the process of the present invention typically provides for a gaseous blend to be combusted in a combustion chamber of a two-stroke cycle internal combustion engine to reach a predetermined state, via a control of the temperature and the pressure into the cylinder at the ignition of the combustion, to enable the engine to operate as a homogeneous-charge compression-ignition engine (HCCI). This process typically allows achieving the predetermined state or conditions for self-ignition with a less lean (richer) and closer to stoichiometric proportions (of the gaseous blend), regardless of the load.

Also, the process of the present invention can typically operate the engine whether it is diesel, with spark plug or HCCI by alternating between a cycle with combustion and a cycle without combustion, as a pneumatic motor using the compressed air for actuation. This compressed air is typically preheated by the heat exchanger to recover some of the heat energy of the exhaust gases. Therefore, the efficiency of the engine can be optimized by reusing a maximum of heat energy generated by the combustion into mechanical power and also by lowering the cooling requirements of the engine.

Due to the configuration of the two-stroke cycle engine and considering that the intake air is like the oxidizer injection into the cylinder, the engine will be able to operate with an Atkinson cycle without pumping effect, since the quantities of air and fuel admitted are completely under control. This improves significantly the energy efficiency of the engine.

In summary, the present invention typically improves the overall energy efficiency of the engine while limiting the produced polluting emissions such as soot, carbon monoxide CO, carbon dioxide $CO_2$ and nitrogen oxides $NO_x$, due to the following characteristics for any type of internal combustion engines:

- Converting a maximum of the heat energy from combustion into mechanical energy.

Generating the optimal predetermined state or conditions (pressure and/or temperature) of the gaseous blend for combustion, regardless of the engine load.

Respecting to the predetermined proportions close to the stoichiometric ratio (of the gaseous blend), regardless the engine load.

Optimizing the gaseous blend (mixture) inside the cylinder by increasing the turbulent intensity and the circulation of the gases.

Eliminating the losses due to the pumping during the intake, especially at low load.

Saving a portion of the energy required for the compression of air.

Recovering energy from the engine, when idling without any external load, in the form of compressed air.

Recovering a portion of the heat energy of the exhaust gases.

Recovering a portion of the kinetic energy vehicle during braking by compressing air.

Reducing losses due to friction between the different mechanical parts (two-stroke cycle engine).

Decreasing the overall weight of the engine (two-stroke cycle engine).

Decreasing the size of the engine (two-stroke cycle engine).

BRIEF DESCRIPTION OF THE DRAWINGS

The figures illustrated are theoretically simplified and devoid of parts such as the various sensors or silencers.

DETAILED DESCRIPTION OF THE INVENTION

Figure 1:
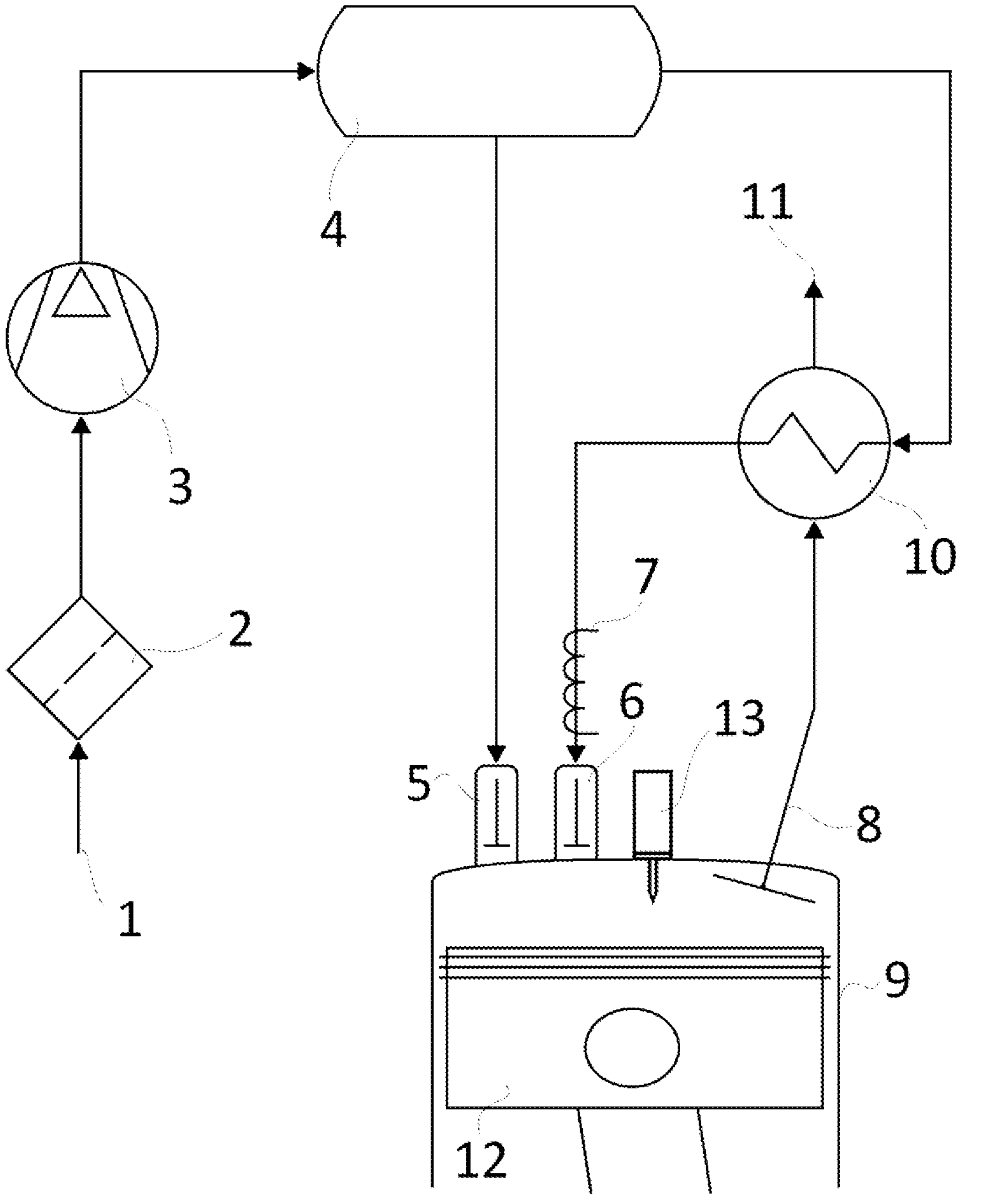
FIG. 1 illustrates an embodiment of a process in accordance with the present invention used in the circuit that is followed by the air from its suction to its exhaust for an internal combustion engine with direct fuel injection, as in a diesel engine.

With reference to FIG. 1, there is shown an embodiment of a process in accordance with the present invention and illustrated with the different parts of the internal combustion engine implied in the process. The process is for controlling a gaseous blend to be combusted in a combustion chamber of a two-stroke cycle internal combustion engine to typically reach a predetermined state (typically temperature, pressure and proper mixture of the different gases/fluids present therein) of the gaseous blend based on a predetermined operating condition (such as load and speed) of the internal combustion engine. The process typically includes the steps of compressing air to be injected into the combustion chamber during at least one of an exhaust operation and a compression operation of a combustion cycle of the internal combustion engine, the compressed air having an air temperature and an air pressure; determining (or adjusting) a first quantity of the compressed air and a second quantity of fuel needed into the combustion chamber to reach the predetermined state of the gaseous blend, the gaseous blend including the compressed air, the injected fuel and a predetermined (or an adjusted) portion of the combusted gaseous blend from a previous combustion cycle; and injecting the first quantity of the compressed air into the combustion chamber during the at least one of the exhaust operation and the compression operation, and the second quantity of the fuel into the combustion chamber during at least one of the at least one of the exhaust operation and the compression operation and an expansion operation of the combustion cycle.

Typically, the step of compressing includes storing the compressed air ((1) from compressor unit (3)) in a reservoir (4), and the step of injecting includes injecting the first quantity of the compressed air directly from the reservoir (4), as illustrated via micro-valve (5).

Figure 2:
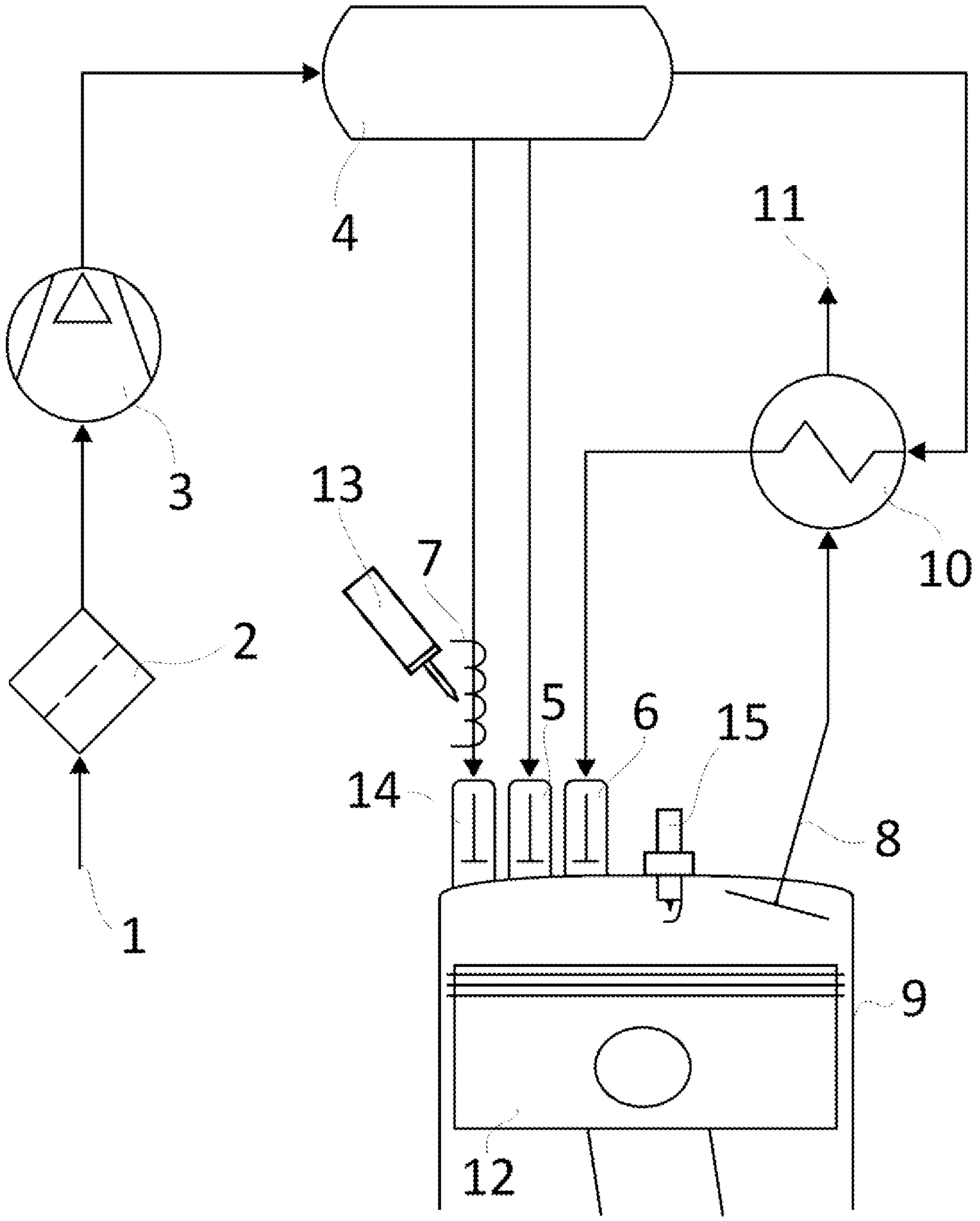
FIG. 2 illustrates another embodiment of a process in accordance with the present invention used in the circuit that is followed by the air from its suction to its exhaust for an internal combustion engine as petrol (or oil/gasoline) engine, with indirect fuel injection upstream of a micro-valve injector unit.

Typically, the step of injecting includes injecting a mixture, as illustrated in FIG. 2 via micro-valve (14), of at least a portion of the first quantity of the compressed air (preferably from the reservoir (4)) with at least a portion of the second quantity of the fuel (via injector (13) in FIGS. 1 and 2).

Also, the process typically further includes a step of heating an amount of the first quantity of the compressed air into hot compressed air, as illustrated by either a heat exchanger (10) to recuperate heat from the exhaust gases (or combusted gaseous blend) from the preceding combustion cycle and passing through the heat exchanger (10), and/or a heating element (7). Then, the step of determining further includes determining a third quantity of the hot compressed air needed into the combustion chamber to reach the predetermined state of the gaseous blend based on the air temperature and the air pressure; and the step of injecting further includes injecting the third quantity of the hot compressed air into the combustion chamber during the at least one of the exhaust operation and the compression operation.

Additionally, the step of heating can further include heating the mixture into hot mixture, as illustrated in FIG. 2 by the heating element (7). Then, the step of determining further includes determining a fourth quantity of the hot mixture needed into the combustion chamber to reach the predetermined state of the gaseous blend based on the air temperature and the air pressure; and the step of injecting further includes injecting the fourth quantity of the mixture into the combustion chamber during the at least one of the exhaust operation and the compression operation. Typically, the step of heating includes heating at least one of the amount of compressed air and the mixture using at least one of a heat exchanger with a remaining portion of the combusted gaseous blend from the previous combustion cycle passing there through, and a heating element.

As illustrated in FIG. 1, the present invention also refers to a two-stroke cycle internal combustion engine including a combustion chamber to be filled with a gaseous blend. An injector unit, such as intake micro valves (5, 6) or the like injectors, is in fluid communication with the combustion chamber to inject at least a first quantity of compressed air having an air temperature and an air pressure into the combustion chamber. An engine control unit (ECU—not shown) is operatively connected with the injector unit (5, 6 of FIGS. 1, and 5, 6, 14 of FIG. 2) to control operation thereof. The engine control unit executes the above-described process to control a predetermined state of the gaseous blend into the combustion chamber based on a predetermined operating condition (load and speed) of the internal combustion engine.

This process is mainly based on the high compression of the air by an auxiliary compressor (3), typically driven by the internal combustion engine. As a result, once the air is typically sucked in (1) and filtered by an air filter (2), and its compression is typically partly carried out by the auxiliary compressor (3) (and not by the piston (12) of the internal combustion engine). Therefore, the energy necessary to make this compression is substantially minimized, because it can be carried out in a well-cooled manner. This compressed air is preferably accumulated in a reservoir (4) at relatively cold temperatures (around ambient environment) and will typically be used in several operations such as combustion oxidizer, heat transfer fluid to recover part of the heat energy of the burnt exhaust gases before releasing them (11) (or having them rejected out) and to actuate pneumatic systems of the engine.

This process typically makes the exhaust of only a portion of the burnt gases, when the piston (12) is close to the bottom dead center. Portion of the burnt gases exhausted are evacuated either by the exhaust valve (8) or by an exhaust port (not shown) located at the bottom of the engine block (9). The duration of the exhaust operation corresponds to a relatively small angle displacement of the crankshaft, especially for a diesel type engine. As a result, some of the hot burnt gases of the preceding combustion cycle remain into the cylinder for use in the current combustion cycle. Furthermore, since compressed air is available, the opening and closing of the exhaust valve (8) can be done extremely quickly without using a spring.

The intake of compressed air, which typically serves as an oxidizer, is carried out by micro-valves (5, 6, 14) or the like which are small, light and with very small displacement stroke, since they allow intake an extremely dense air. These micro-valves (5, 6 and 14) are preferably assimilated to oxidizer injectors in the cylinder. The availability of the compressed air can be easily controlled via the individual operation of these micro-valves (5, 6 and 14) by the engine control unit (ECU).

The intake micro-valves (5, 6 and 14) are to ensure a maximal pressure drop when they are closed in order to limit the leakage as much as possible. In order to preserve the pressure in the reservoir (4), the sealing is typically ensured by other valves (not shown) fitted with seal gaskets or the like. These other valves are usually actuated as soon as the engine is stopped.

The air intake operation manifests as an injection of oxidizer into the cylinder with a large turbulent flow intensity. It is carried out at the same time with the exhaust and/or compression operations. When the intake is carried out in parallel with the exhaust, it is used to regulate and adjust the quantity of the burnt gases of the preceding combustion cycle to be kept for the current cycle. As the air admitted into the cylinder comes from a confined place which is the reservoir (4) of compressed air, the temperature and pressure are known with high accuracy. As a result, the quantity of air admitted into the cylinder can be controlled with great accuracy also. On the other hand, due to the pressure difference between the upstream and downstream of the micro-valves (5, 6 and 14), the intake air is manifested as a jet in the cylinder with high turbulent flow intensity and a very large mixing section (thereby increasing the recirculation of the gases inside the cylinder). Therefore, the air/fuel mixture (or gaseous blend) gets more homogenous during the combustion. Consequently, the appearance of the soot and the unburned fuel after combustion decreases.

In order to regulate the temperature and/or the pressure at the moment when the combustion is engaged, the intake air is typically done by at least two micro-valves (5, 6, and 14):

The micro-valves (5, 14) introduce the relatively cold air coming directly from the reservoir (4).

The micro-valve (6) introduces the relatively hot air, by passing it through a heat exchanger (10) which recovers some of the heat from the exhaust gases.

The ECU typically predetermines the opening time of each micro-valve, in order to adjust the predefined quantities to be admitted. The quantity of the hot burnt gases kept in the cylinder depends on the quantity of the compressed air admitted into the cylinder by the micro-valves (5, 6 and 14), when the exhaust valve (8) is still open. This compressed air will expel and exhaust the burnt hot gases from the cylinder according to the quantity of the compressed air being admitted. Once the intake is complete, the rest of the upward stroke of the piston (12) is dedicated only to the compression of the air or of the air/fuel mixture (or gaseous blend) until confinement in the combustion chamber.

The final mixture (or gaseous blend) inside the cylinder at combustion is composed by all quantities of compressed air and/or compressed air/fuel mixture injected into the cylinder by the different micro-valves (5, 6 and 14) and the quantity of the burnt gases kept in the cylinder. The temperature and/or the pressure (predetermined state) of the final mixture (or gaseous blend) inside the cylinder are controlled when the combustion is engaged while respecting proportions fuel/oxidizer close to the stoichiometric ratio (of the gaseous blend), because the ECU adjusts (or determines) the different predefined quantities of compressed air injected into the cylinder by the different micro-valves (5, 6 and 14), and the quantity of the burnt gases kept in the cylinder. Those different predefined quantities depend on predetermined operating conditions of the engine, i.e. the data coming from the various sensors, the load, the RPM, the different temperatures and pressures of compressed air admitted, and the temperature of the burnt gases kept in the cylinder which is deduced from the quantity of fuel injected from the preceding combustion cycle.

In the case of a diesel type engine, as illustrated in FIG. 1, this process typically ensures regardless of the load the set point temperature which guarantees the auto-ignition while respecting proportions of fuel/oxidizer close to the stoichiometric ratio (of the gaseous blend). This is usually accomplished by non-exhausted hot gases kept in the cylinder and the intake air admitted with a predetermined quantity which is heated by while passing through a heat exchanger (10) in advance or via electric heating (7) when there is not enough heat to be recovered (as in the case of cold start or the like). The heating that should come from the compression will be minimized and compensated by the heat recovered from the exhaust gases and that of the burnt hot gases of the preceding cycle kept in the cylinder. This process typically provides the stabilization of the auto-ignition conditions at the injection of the fuel (13) while respecting the proportions air/fuel close to the stoichiometric ratio (of the gaseous blend) regardless of the load.

In the case where the engine uses a spark plug (15) for ignition, as illustrated in FIG. 2, this process typically allows to have a set point pressure at the moment of ignition by the spark plug (15) while respecting proportions fuel/oxidizer close to the stoichiometric ratio (of the gaseous blend) regardless of the load. To avoid engine knocking, the more the load increases the more the set pressure must decrease. In other words, the more the load increases the more the quantity of hot burnt gases to exhaust must be increased, and/or the more the compressed air must be injected with the relatively cold temperature via the micro-valve (5) relative to the relatively hot temperature via the micro-valve (6). As a result, the pressure at the time of ignition can usually be controlled and the engine could behave like a variable compression ratio engine.

Still referring to FIG. 2, the indirect injection of the fuel by the injector (13) is preferred because this provides more time for the fuel to volatilize and evaporate. A second micro-valve (14) is added of relatively cold compressed air provided directly from the reservoir (4). The fuel is typically injected upstream of the micro-valve (14). The heating (7) at injection of the fuel typically serves to supply the necessary heating to enhance the evaporation of the fuel. This heating (7) is typically electrical at cold but could also be supplied by the engine oil or the cooling liquid, once the engine is hot enough. Typically, the air/fuel mixture that forms upstream of this micro-valve (14) must be rich so that the final mixture in the cylinder by adding all the quantities of air admitted by the intake micro-valves (5, 6 and 14) at the time of ignition is close to the stoichiometric ratio (of the gaseous blend). However, the intake of the air/fuel mixture by the micro-valve (14) is typically done once the temperature of the gases inside the cylinder is regulated by the intake of compressed air by the other micro-valves (5, 6) in order to avoid the auto-ignition of the mixture.

This process, by providing a control of the temperature and the pressure (predetermined state) into the cylinder at the ignition of the combustion, typically allows the engine to operate as an homogeneous-charge compression-ignition engine (HCCI). This process also usually allows achieving the conditions of auto-ignition at less lean (richer) and closer to stoichiometric proportions (of the gaseous blend), regardless of the load.

Finally, this process typically operates the engine whether it is diesel, with spark plug or HCCI by alternating between a cycle with a combustion and a cycle without a combustion, as a pneumatic motor, using the compressed air to actuate it. The compressed air is typically previously heated by the exchanger (10) to recover the heat energy of the exhaust gases. Therefore, the efficiency of the engine is typically optimized by converting the maximum heat energy generated by the combustion into mechanical power, and also reducing the cooling requirements of the engine.

In summary, the present invention improves the overall energy efficiency of the engine and limits the polluting emissions produced such as soot, carbon monoxide CO, carbon dioxide $CO_2$ and nitrogen oxides $NO_x$.

The invention claimed is:

1. A process for controlling a gaseous blend to be combusted in a combustion chamber of a two-stroke cycle internal combustion engine to reach a predetermined state of temperature, pressure, and air/fuel ratio of the gaseous blend at combustion based on a predetermined operating condition of the internal combustion engine, said process comprising the steps of:

compressing air to be injected into the combustion chamber during at least one of an exhaust operation and a compression operation of a combustion cycle of the internal combustion engine, said compressed air having an air temperature and an air pressure;

heating an amount of the compressed air into hot compressed air;

determining a first quantity of the compressed air, a second quantity of fuel, and a third quantity of hot compressed air needed into the combustion chamber to reach the predetermined state of the gaseous blend, the gaseous blend including the compressed air, the hot compressed air, the injected fuel and a predetermined portion of the combusted gaseous blend from a previous combustion cycle; and injecting the first quantity of the compressed air and the third quantity of hot compressed air into the combustion chamber during the at least one of the exhaust operation and the compression operation, and the second quantity of the fuel into the combustion chamber during at least one of the at least one of the exhaust operation and the compression operation and an expansion operation of the combustion cycle.

2. The process of claim 1, wherein the step of injecting includes injecting a mixture of at least a portion of the first quantity of the compressed air with the second quantity of the fuel.

3. The process of claim 1, wherein the step of compressing includes storing the compressed air in a reservoir, the step of heating includes heating an amount of the compressed air from the reservoir, and the step of injecting includes injecting the first quantity of the compressed air directly from the reservoir.

4. The process of claim 3, wherein the step of injecting includes injecting a mixture of at least a portion of the first quantity of the compressed air with the second quantity of the fuel.

5. The process of claim 3, wherein the step of compressing includes using a compressor unit connected to the reservoir to store the compressed air therein.

6. The process of claim 5, wherein the step of heating further includes heating the mixture into hot mixture; and the step of injecting including injecting the hot mixture into the combustion chamber during the at least one of the exhaust operation and the compression operation.

7. The process of claim 6, wherein the step of heating includes heating at least one of the amount of compressed air and the mixture using at least one of a heat exchanger with a remaining portion of the combusted gaseous blend from the previous combustion cycle passing there through, and a heating element.

8. The process of claim 3, wherein the step of heating includes heating the amount of compressed air using at least one of a heat exchanger with a remaining portion of the combusted gaseous blend from the previous combustion cycle passing there through, and a heating element.

9. A two-stroke cycle internal combustion engine comprising:

a combustion chamber to be filled with a gaseous blend;

a first injector unit being in fluid communication with the combustion chamber to inject at least a first quantity of compressed air having an air temperature and an air pressure into the combustion chamber;

a heating member for heating an amount of the compressed air into hot compressed air;

a second injector unit being in fluid communication with the combustion chamber to inject at least a third quantity of the hot compressed air into the combustion chamber; and an engine control unit operatively connected with the first and second injector units to control operation thereof and inject the first quantity of compressed air, a second quantity of fuel, and the third quantity of hot compressed air into the combustion chamber, the engine control unit executing the process of claim 1 to control a predetermined state of temperature, pressure, and air/fuel ratio of the gaseous blend at combustion into the combustion chamber based on a predetermined operating condition of the internal combustion engine.

* * * * *